Figures 1, 2:
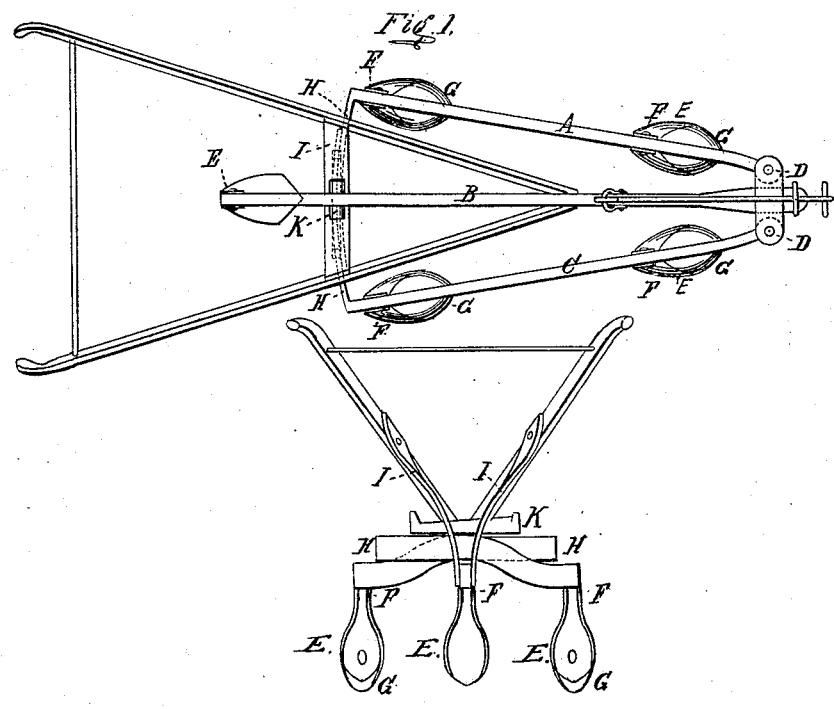

C. M. RISLEY & C. B. ROGERS.
Cultivators.

No. 147,068. Patented Feb. 3, 1874.

Witnesses. Inventors.

UNITED STATES PATENT OFFICE.

CALEB M. RISLEY, OF WOODBURY, NEW JERSEY, AND CLAYTON B. ROGERS, OF PHILADELPHIA, PENNSYLVANIA.

IMPROVEMENT IN CULTIVATORS.

Specification forming part of Letters Patent No. 147,068, dated February 3, 1874; application filed May 18, 1872.

*To all whom it may concern:*

Be it known that we, CALEB M. RISLEY, of Woodbury, county of Gloucester, State of New Jersey, and CLAYTON B. ROGERS, of Philadelphia, Pennsylvania, have invented certain Improvements in Cultivators for agricultural purposes, of which the following is a specification:

Our invention relates to that class of cultivators made principally of iron, and adjustable in their spread or width, so as to be adaptable to the purpose of cultivating between the rows of growing Indian corn without straddling the row; and it consists in the peculiar construction and combination, with the frame of the cultivator, of two sliding back bars, a slotted stay, and a wedge-key for securing the said bars at any required position in the slots of the stay, the central or draft-bar remaining stationary in relation to the two side bars of the frame, and the two side bars being hinged to the center bar in front, so as to allow them to be adjusted to suit any width between the rows of the growing corn, potatoes, or other article to be cultivated; the object of this part of our invention being to afford increased facilities in the adjustment of the width of the cultivator as occasion may at any time require, to give increased stability to the side bars of the frame, and to the wooden handles of the cultivator.

Referring to the drawings, Figure 1 is a plan view of the improved cultivator, and Fig. 2 is an elevation of the rear end of the same.

B is the central or draft-bar of the frame; A and C, the two adjustable side bars of the same; D, a cross-bar fixed to the forward end of the central bar, and to the respective ends of which the two side bars are articulated or jointed; E F E F, the standards to which the hoes or shovels G G are respectively and adjustably attached; H H, the two back bars whereby the two side bars A and C are adjusted (in relation to the center bar B) in the slotted stay-pieces or bent bars I; and K, the key-wedge whereby the said back bars H H are rigidly secured in the slots of the stay-pieces I. The bars A B C are each made of bar-iron, the central bar being about half-inch by one and a quarter inch, and the side bars A and C about one-quarter inch by one inch in width and thickness, more or less, and are each secured to the cross-piece D, with their broad sides vertical. The forward end of B is rigidly fixed in the middle of the cross-piece D, and the respective forward ends of the two side pieces A and C are articulated or jointed to the respective ends of D. The rear ends of A and C are respectively bent inward laterally to a curve concentric to their respective turning-points in D, and also curved upward and downward so that their respective lower edges will be on a horizontal plane with the upper edge of the central bar B, as shown in Fig. 2. The object of this bent form of the back bars H H is that the side bars A and C may be moved laterally without rising or falling as the back bars are moved by sliding against each other in the slots of the stay-bar I. The stay-bar I is bent in its midlength so as to form a stirrup or loop through which the rear end of the center bar B passes, and is permanently fixed, the two ends of said stay I being also extended upward, spread apart, and fixed permanently to the two respective handles of the cultivator, as shown in Fig. 2. Just above the upper edge of the center bar B, an oblong rectangular slot is made through each of the two uprights of the stay I, wide enough to admit the horizontal ends of the two back bars H H, and allow them to be slipped, the one against the other, for the purpose of adjusting the two side bars A and C at any required distance apart, and long enough to receive the key-wedge K between the upper edges of the two back bars H and the top boundary of the slots in the stay I I, whereby the said bars H H, and consequently the side bars A C, are firmly secured. (See Fig. 2.) It will therefore be seen that the adjustment of the side bars A C can be effected with the greatest facility, and that they will be firmly held in position as adjusted, their forward ends being securely held by the cross-bar D, to which they are articulated. The upper end of each of the standards F F is slotted to the exact width and thickness of the respective bars A B C, which fit accurately in the respective slots, the bottom of which latter being flat or straight so as to allow the lower edge of the bar to fit closely along on the same, while the upper end of the standard is even with the upper edge of the bar. The standards are permanently and firmly secured to the bars by means of transverse bolts or rivets. The hoes or shovels G G are adjustably secured to the standards, are made of steel, and both their upper and lower ends alike, so as to be reversible when the one end becomes worn dull by use.

We are aware that the patent of Belden, February 13, 1866, and the patent of Partins & Finney, May 16, 1871, show and describe certain modes of adjusting the bars of the frame of a cultivator at any required distances apart from each other, and therefore we do not desire to claim either of said devices; but

We claim as our invention—

The two sliding back bars H H, the slotted stays I, and wedge-key K, in combination with the bars A B C, and handles of the frame of the cultivator, the said parts being constructed and arranged as and for the purposes hereinbefore set forth and described.

CALEB M. RISLEY.
CLAYTON B. ROGERS.

Witnesses:
J. P. DELMEY,
WM. J. DOYLE.